United States Patent
Hazlett et al.

(10) Patent No.: US 12,117,334 B1
(45) Date of Patent: Oct. 15, 2024

(54) PATIENT WEIGHING SYSTEM FOR A PATIENT TRANSPORT DEVICE

(71) Applicant: Hinckley Medical, Inc., Lakeville, MN (US)

(72) Inventors: Tristen Hazlett, Lakeville, MN (US); Colton Hazlett, Lakeville, MN (US)

(73) Assignee: Hinkley Medical, Inc., Lakeville, MN (US)

( * ) Notice: Subject to any disclaimer, the term of this patent is extended or adjusted under 35 U.S.C. 154(b) by 384 days.

(21) Appl. No.: 17/843,450

(22) Filed: Jun. 17, 2022

Related U.S. Application Data

(60) Provisional application No. 63/212,399, filed on Jun. 18, 2021.

(51) Int. Cl.
| | | |
|---|---|---|
| *G01G 19/44* | (2006.01) | |
| *A61G 1/04* | (2006.01) | |
| *G01G 23/18* | (2006.01) | |

(52) U.S. Cl.
CPC .......... *G01G 19/445* (2013.01); *A61G 1/04* (2013.01); *G01G 23/18* (2013.01); *A61G 2203/44* (2013.01)

(58) Field of Classification Search
CPC ........ G01G 19/445; G01G 23/18; A61G 1/04; A61G 2203/44
USPC ......................................................... 177/132
See application file for complete search history.

(56) References Cited

U.S. PATENT DOCUMENTS

| | | |
|---|---|---|
| 6,680,442 B1 | 1/2004 | Rynd et al. |
| 7,199,311 B1 | 4/2007 | Buckner et al. |
| 9,009,891 B2 | 4/2015 | Receveur et al. |
| 10,314,754 B2 * | 6/2019 | Karwal .................. A61G 7/008 |
| 10,768,040 B2 | 9/2020 | Taylor et al. |
| 10,959,891 B1 | 3/2021 | Mooney |
| 2011/0302720 A1 * | 12/2011 | Meyer .................. A47C 27/088 |
| 2012/0259378 A1 | 10/2012 | Heinrichs et al. |
| 2020/0330299 A1 | 10/2020 | Heneveld, Jr. et al. |
| 2021/0298682 A1 | 9/2021 | Hayes et al. |
| 2021/0298683 A1 * | 9/2021 | Jung ..................... G01G 19/445 |

FOREIGN PATENT DOCUMENTS

| | | | |
|---|---|---|---|
| KR | 101725006 B1 | 4/2017 | |
| WO | WO 20211108377 | * 3/2021 | ............... A61G 7/05 |
| WO | WO-2021108377 A1 | * 6/2021 | ............. A61G 7/002 |

* cited by examiner

*Primary Examiner* — Jacques M Saint Surin
(74) *Attorney, Agent, or Firm* — Suiter Swantz IP

(57) ABSTRACT

A patient weighing system is disclosed. The system may include a set of overlays configured to cover a top face of a patient transport device. The system may further include a set of attachment sub-systems configured to couple each overlay to the top face of the patient transport device. The system may further include a set of sensor sub-systems including a load cell and a housing assembly. Each housing assembly may include at least a top dome housing portion. The top dome housing portion may have one degree of freedom along a z-axis and the load cell may be configured to compress and generate an electrical voltage when force is applied along the z-axis of the load cell. Each set of sensor sub-systems may be configured to measure a weight of a portion of a patient's body.

20 Claims, 13 Drawing Sheets

PATIENT WEIGHING SYSTEM FOR A PATIENT TRANSPORT DEVICE

CROSS-REFERENCE TO RELATED APPLICATIONS

The present application claims the benefit under 35 U.S.C § 119(e) of U.S. Provisional Patent Application Ser. No. 63/212,399, filed Jun. 18, 2021, entitled SYSTEM AND METHOD FOR MEASURING WEIGHT, naming Tristen Hazlett as inventor, which is incorporated herein by reference in the entirety.

TECHNICAL FIELD

The present disclosure generally relates to the field of weight measurement systems, and more particularly to, a patient weighing system for a patient transport device.

BACKGROUND

Medical professionals often need to get a precise weight measurement. This is often difficult to do in emergency medical settings or other hospital settings due to the condition of the patient, the condition of the environment, time restraints, or the like. There is a need to provide accurate weight measurements to reduce/eliminate medication dosing errors due to inaccurate weight and medication calculation, particularly among pediatric patients and unconscious patients.

SUMMARY

A patient weighing system is disclosed, in accordance with one or more embodiments of the present disclosure. The patient weighing system includes a set of overlays configured to cover a top face of a patient transport device, each overlay of the set of overlays including one or more cut outs. The patient weighing system includes a set of attachment sub-systems, each attachment sub-system of the set of attachment sub-systems configured to couple each overlay of the set of overlays to the top face of the patient transport device, each attachment sub-system of the set of attachment sub-systems including a guide assembly, the one or more cut outs of each overlay of the set of overlays configured to receive a portion of the guide assembly. The patient weighing system includes a set of sensor sub-systems, each overlay of the set of overlays including at least one set of sensor sub-systems arranged on a bottom face of each overlay of the set of overlays, each set of sensor sub-systems including at least three sensor sub-systems, each sensor sub-system of the set of sensor sub-systems including at least one load cell, the at least one load cell configured to electrically couple to at least one voltage amplification board, each sensor sub-system of the set of sensor sub-systems further including a housing assembly configured to house at least a portion of the at least one load cell, each housing assembly including at least a top domed housing portion, the top dome housing portion having one degree of freedom along a z-axis, the at least one load cell configured to compress and generate an electrical voltage when force is applied along the z-axis of the at least one load cell, each set of sensor sub-systems configured to measure a weight of a portion of a patient's body. The patient weighing system includes a user interface device including a display. The patient weighing system includes a controller communicatively coupled to each sensor sub-system of the set of sensor sub-systems and the user interface device, the controller including one or more processors configured to execute a set of program instructions stored in a memory, the set of program instructions configured to cause the one or more processors to: receive at least a first weight corresponding to a first portion of a patient's body from the at least three sensor sub-systems of at least a first set of sensor sub-systems; receive at least an additional weight corresponding to an additional portion of a patient's body from the at least three sensor sub-systems of at least an additional set of sensor sub-systems; calculate a total patient weight by summing the received first weight and received additional weight; and generate one or more control signals configured to cause the display of the user interface device to display the calculated total patient weight.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
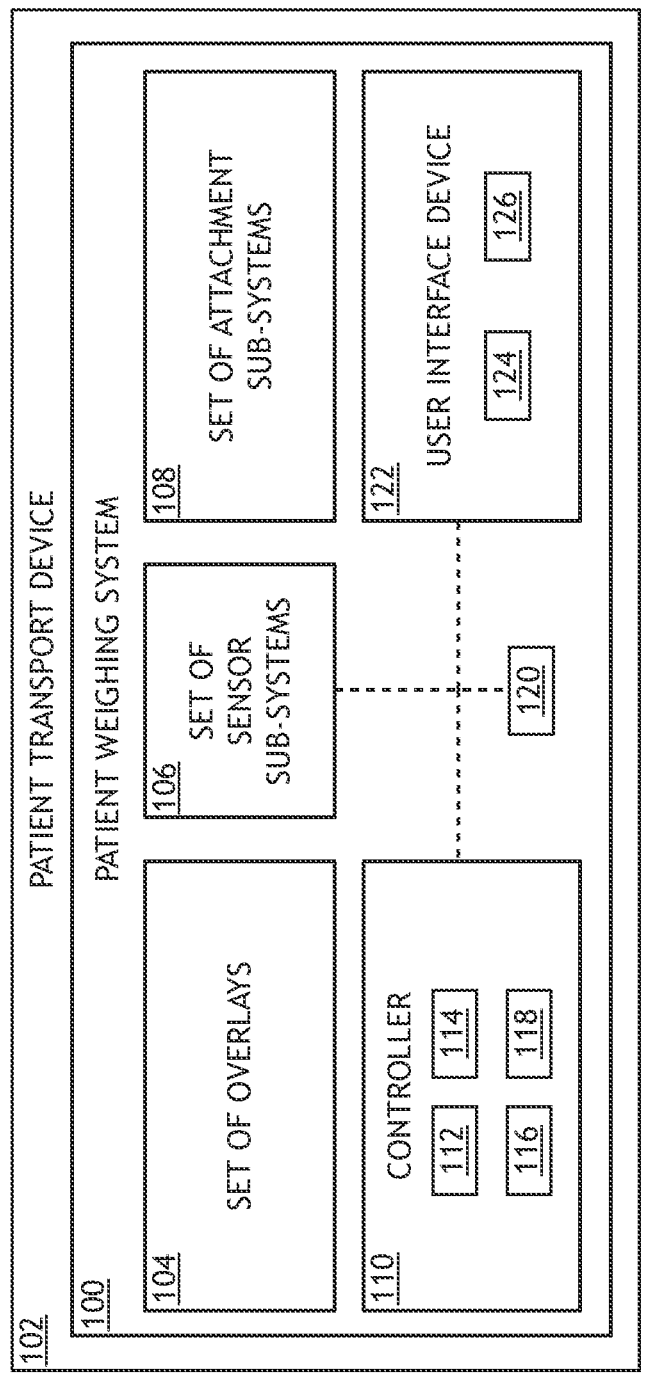
FIG. 1A illustrates a simplified block diagram of a patient transport device including a patient weighing assembly, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Medical professionals need to get a precise weight measurement. This is often difficult to do in emergency medical settings or other hospital settings due to the condition of the patient, the condition of the environment, time restraints, or the like. For example, prehospital dosing errors in pediatric patients affects approximately 56,000 U.S. children annually. A survey indicated that the underlying cause of prehospital medication errors included, weight estimation errors, problematic references, and calculation errors. By way of another example, in stroke patients that survival rate is dependent on a timely and effective treatment process. An accurate weight is needed in a timely manner without the need to transfer the patient away from the patient transport device. By way of another example, in the Air Emergency Medical Services Industry knowledge of accurate patient weight is vital to safe air medical transport and critical care. Patient weight is often unknown in emergency settings, and visual estimations have been shown to be inaccurate, especially in obese patients. Due to most air EMS usage of helicopters to quickly transport patients in need of medical treatment, knowledge of the weight is even more essential. This is due to the operation of the helicopter itself as the weight of the load in the helicopter prior to takeoff is vital information the pilot needs to safely transport the patients.

In addition, in select industries the build of the patient transport device (and any included components within the build) may be required to meet guidelines and/or standards. For example, patient transport devices (and any included components) may be required to meet patient transport safety guidelines and/or standards. For instance, the select patient transport may need to be configured in accordance with patient transport safety guidelines and/or standards put forth by, but not limited to, the Society of Automotive Engineers (SAE), Ambulance Manufacturers Division (AMD), or any other standards setting organization or company. Patient weighing systems for patient transport devices may present difficulties such as, but not limited to, failing to meet vertical component retention static test requirements, or the like as set forth by the AMD in AMD Standard 028, VERTICAL COMPONENT RETENTION—STATIC TEST—2019. Further, Patient weight systems for patient transport devices may present difficulties such as, but not limited to, failing to meet ambulance equipment mount device or systems requirements, or the like as set forth by the SAE in J3043_201407, AMBULANCE EQUIPMENT MOUNT DEVICE OF SYSTEMS.

As such, it would be desirable to provide a patient weighing system for a patient transport device. The patient weighing system should be configured to calculate an accurate patient weight. For example, the patient weighing system should be configured to allow medical professionals to calculate a precise weight, such that the medical professional is able to obtain a precise weight-based dosage. The patient weighing system should be configured in accordance with patient transport guidelines and/or standards.

Figure 1B:
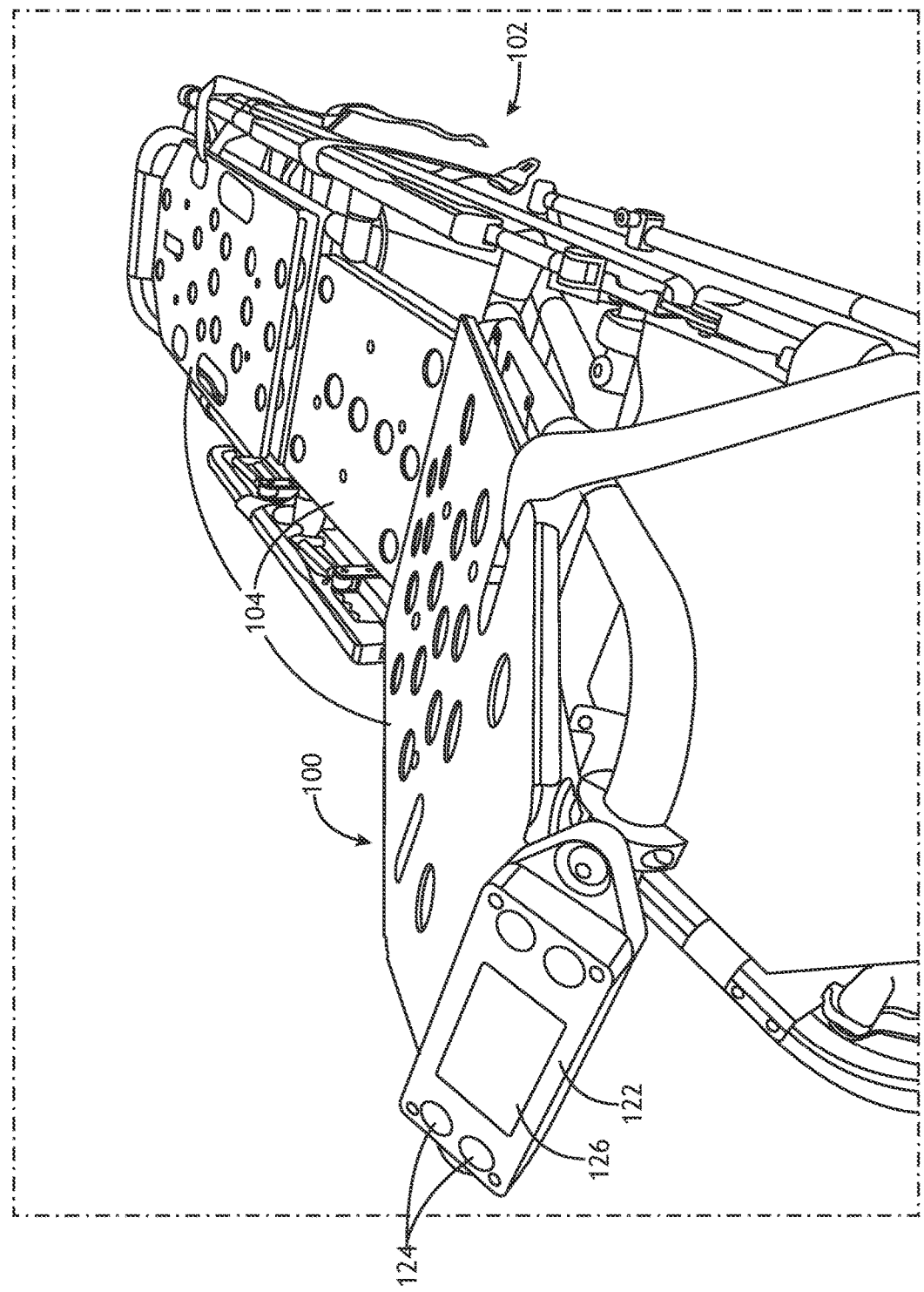
FIG. 1B illustrates a schematic view of a patient transport device including a patient weighing assembly, in accordance with one or more embodiments of the present disclosure.
Figure 2A:
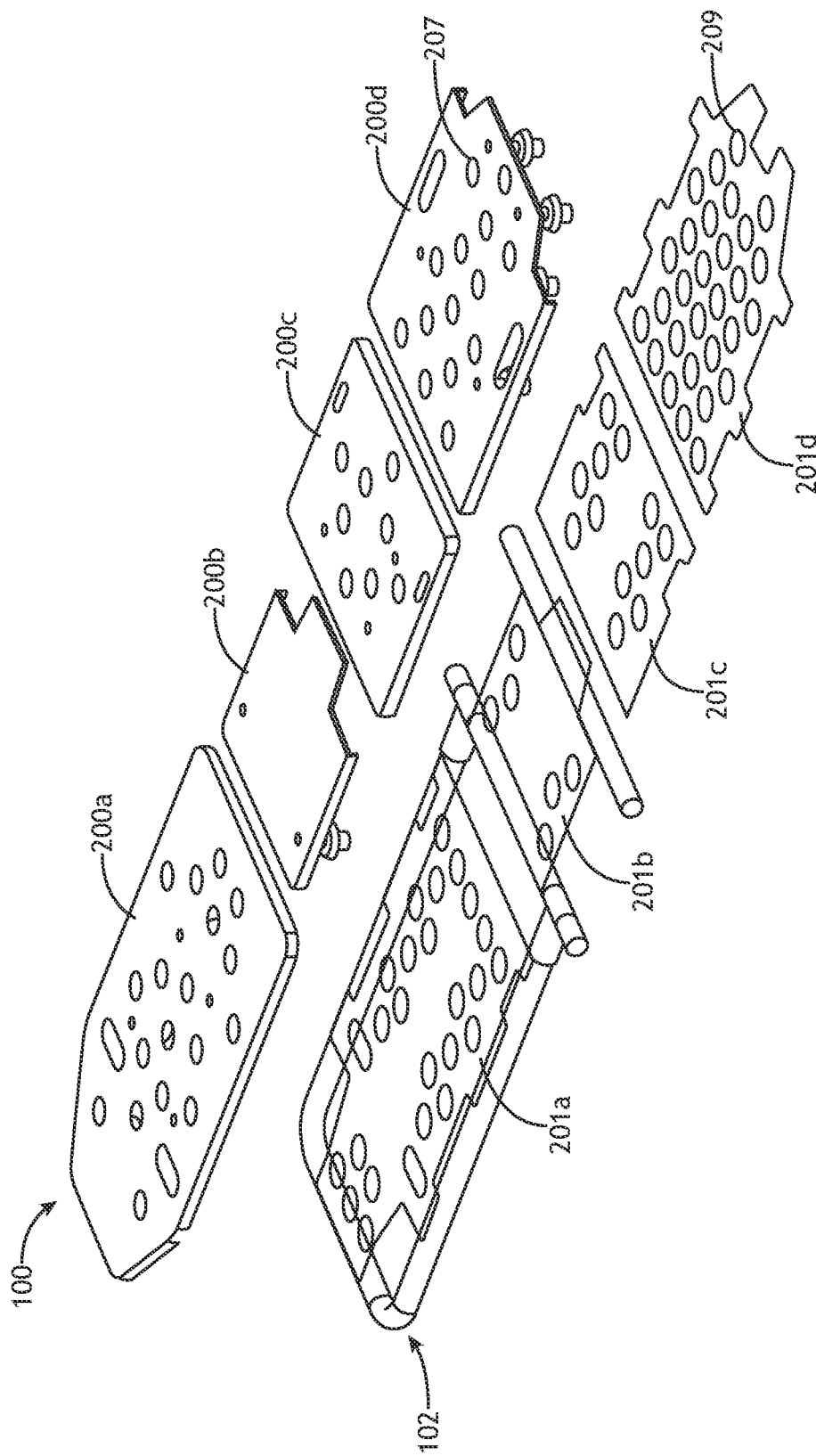
FIG. 2A illustrates an exploded view of a patient transport device including a patient weighing system, in accordance with one or more embodiments of the present disclosure.
Figure 2B:
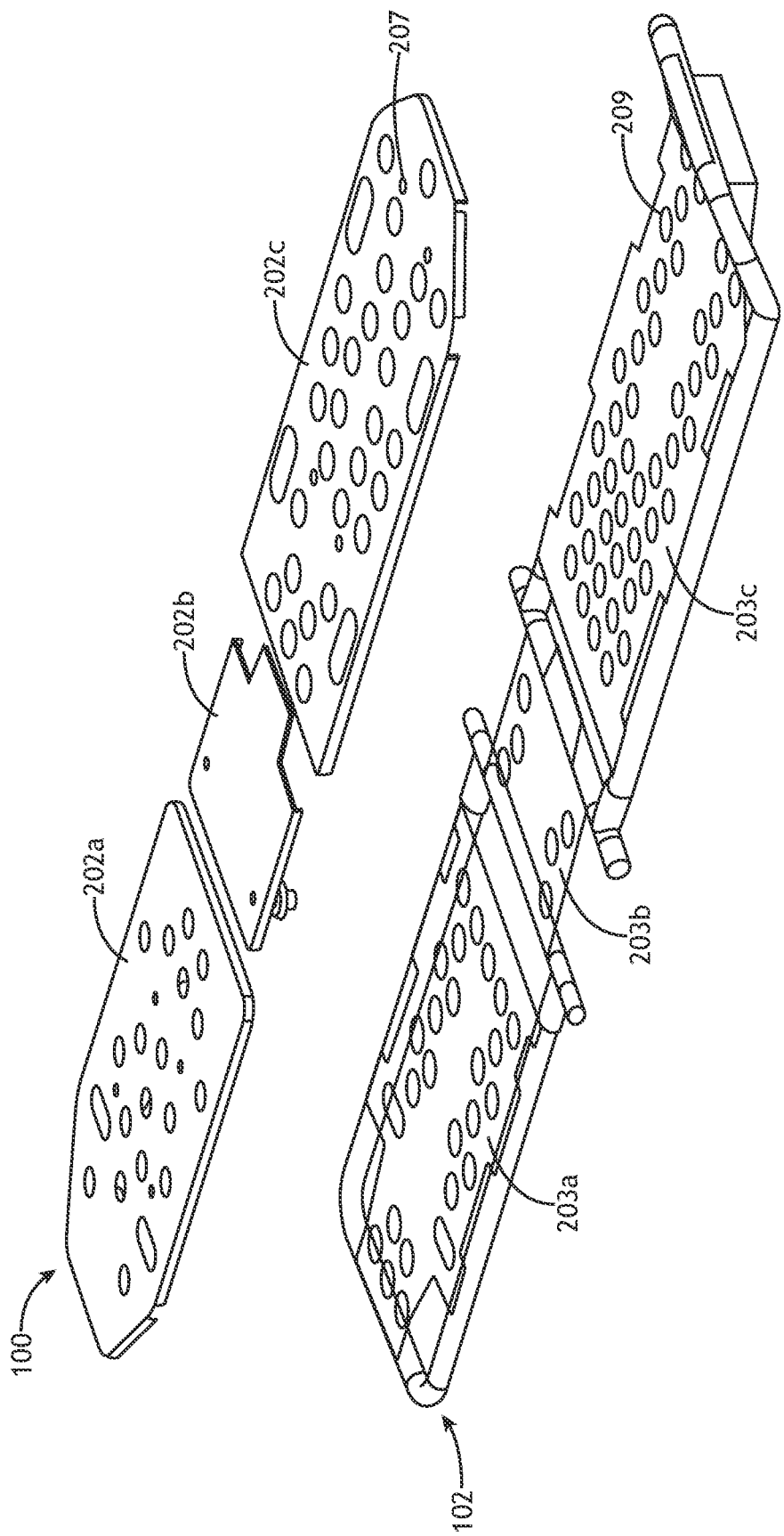
FIG. 2B illustrates an exploded view of a patient transport device including a patient weighing system, in accordance with one or more embodiments of the present disclosure.
Figure 2C:
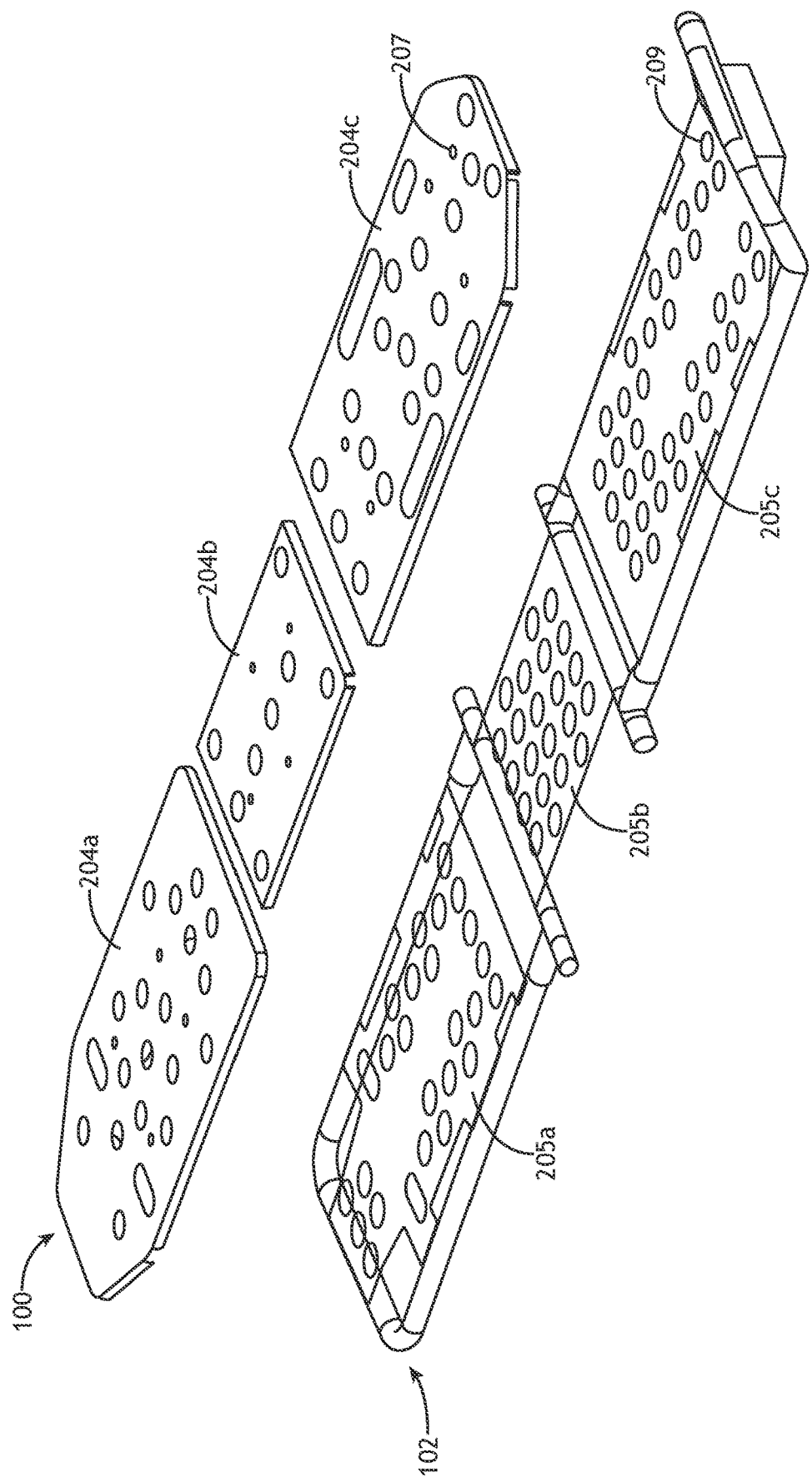
FIG. 2C illustrates an exploded view of a patient transport device including a patient weighing system, in accordance with one or more embodiments of the present disclosure.

FIG. 1A illustrates a simplified block diagram a patient weighing system 100 for a patient transport device 102, in accordance with one or more embodiments of the present disclosure. FIG. 1B illustrates a schematic view of the patient transport device 102 including the patient weighing system 100, in accordance with one or more embodiments of the present disclosure. FIGS. 2A-2C illustrate exploded views of the patient weighing system 100 for the patient transport device 102, in accordance with one or more embodiments of the present disclosure.

The patient weighing system 100 may include a set of overlays 104. For example, as shown in FIG. 2A, the patient weighing system 100 may include a first overlay, a second overlay, a third overlay, and a fourth overlay. For instance, the set of overlays 104 may include a top overlay 200a, a knee catch overlay 200b, a middle overlay 200c, and a bottom overlay 200d. By way of another example, as shown in FIG. 2B, the patient weighing system 100 may include a first overlay, a second overlay, and a third overlay. For instance, the patient weighing system 100 may include a top overlay 202a, a knee catch overlay 202b, and a bottom overlay 202c. By way of another example, as shown in FIG. 2C, the patient weighing system 100 may include a first overlay 204a, a second overlay 204b, and a third overlay 204c. For instance, the patient weighing system 100 may include a top overlay 204a, a middle overlay 204b, and a bottom overlay 204c. Although FIGS. 2A-2C illustrate a specific configuration (e.g., layout, number, or the like) of overlays 200a-204c, it is noted herein that the patient weighing system 100 may include any configuration of overlays (e.g., layout, number, or the like). Further, although FIGS. 2A-2C illustrate multiple overlays 200a-204c, it is noted that the system 100 may include a single overlay configured to cover a top face of the patient transport device 102. FIGS. 2A-2C are provided merely for illustrative purposes and therefore should not be construed as limiting the scope of the present disclosure.

Each overlay of the set of overlays 104 may be formed of any material known in the art suitable for providing support such as, but not limited to, steel, aluminum, titanium, platinum, or the like. As shown in FIG. 1B, each overlay of the set of overlays 104 may be configured to couple to one or more portions of the patient transport device 102 (via an attachment sub-system 108), which is discussed further herein. Further, in some embodiments, a top face of the set of overlays may be configured to receive a bottom portion of a cushion of the patient transport device, such that the overlay is positioned between the frame of the patient transport device 102 and the cushion of the patient transport device 102. For purposes of the present disclosure, the patient weighing system 100 may be configured for use with any patient transport device. For example, the patient transport device 102 may include, but is not limited to, a gurney (e.g., a patient transport device with wheels), a stretcher (e.g., patient transport device without wheels), or the like. Further, the patient weighing system 100 may be used with any manufactured design type including, but not limited to, Stryker® designs, Ferno® designs, or the like. Although FIGS. 2A-2C illustrate a specific type of patient transport device 102, it is noted that the patient transport device 102 may be any size and/or shape.

Referring to FIG. 1B, the patient transport device 102 may be configured to actuate between one or more positions, which in turn may be actuate one or more of the overlays 104. For example, a frame of the patient transport device may be configured to actuate between at least an upright position and a bed position, causing the set of overlays 104 to actuate. For instance, as shown in FIG. 1B, a portion of the frame of the patient transport device 102 may be configured to actuate to cause the top overlay to be in an upright position.

Figure 3:
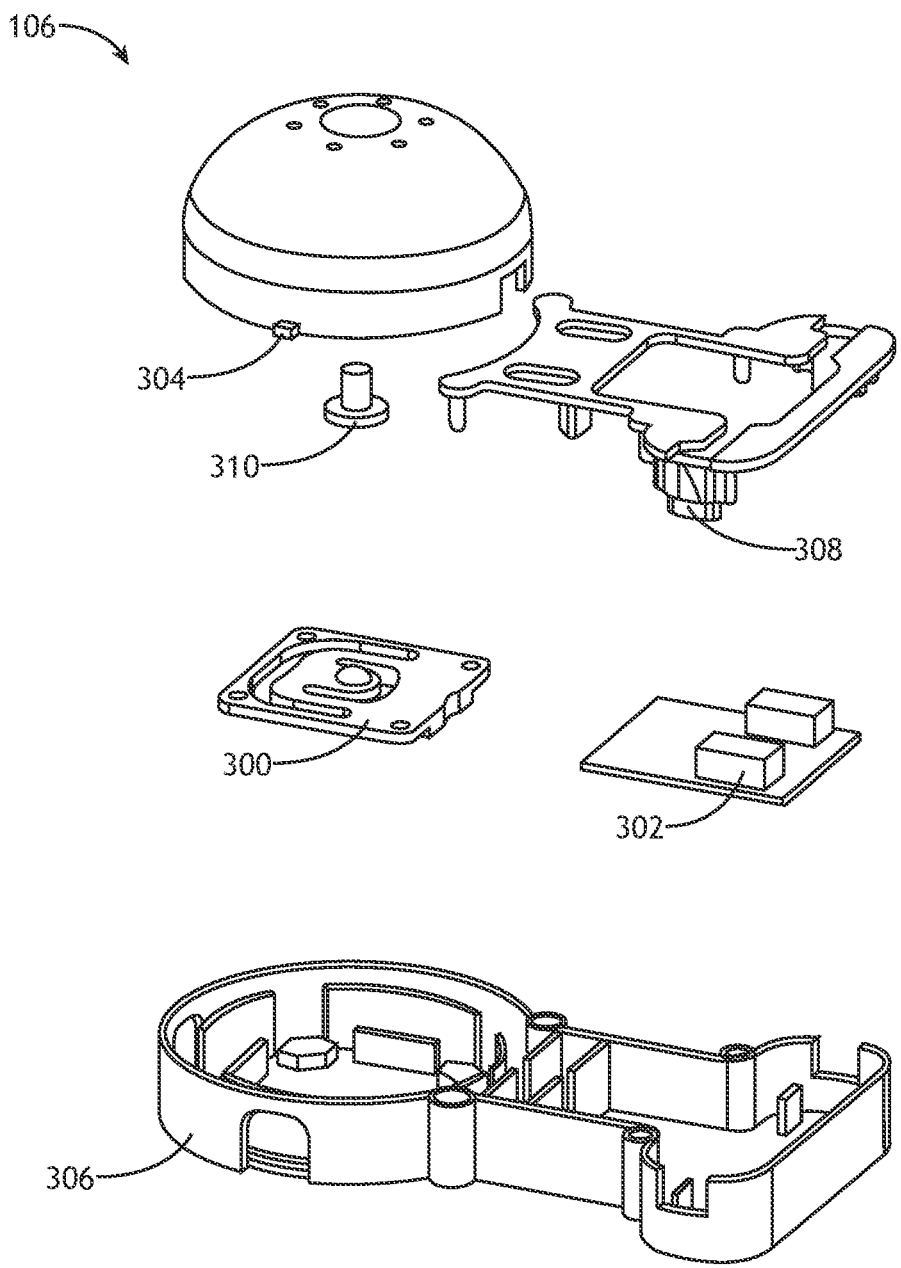
FIG. 3 illustrates an exploded view of a load sensor sub-system of the patient weighing system, in accordance with one or more embodiments of the present disclosure.

The patient weighing system 100 may include a set of sensor sub-systems 106. Referring to FIG. 3, each sensor sub-system 106 may include at least one load sensor 300. The at least one load sensor 300 may be configured to electrically couple to a voltage amplification board 302 (amp board 302). For example, the patient weighing system 100 may include a plurality of amp boards 302 configured to electrically couple to the plurality of load sensors 300, where each amp board 302 is electrically coupled to each load sensor 300. By way of another example, the patient weighing system 100 may include a single amp board 302 configured electrically coupled to the plurality of load sensors 300, where each load sensor 300 is electrically coupled to the single amp board 302.

Each sensor sub-system 106 may include a circular load cell 300 with one point of contact. For example, each load cell 300 may be configured to generate an electrical voltage when force is applied along a z-axis (e.g., to the strain gauge). In this example, the electrical voltage is amplified using a voltage amplification board 302 such that an analog to digital converter may be configured to read the input signal. Further, in this example, the input signal is used in a computer algorithm configured to correlate the generated voltage from the load cell with a patient's weight on the patient transport device 102.

The amplification board 302 may be configured to amplify the signal from the one or more load sensors 300 and compare that signal to a reference voltage derived from the main PCB. Further, the amplification board 302 may be configured to send an analog value to the main PCB. The amp board 302 may include, but is not limited to, one or more gain setting resistors, a loadcell input voltage, a low pass filter, one or more buffer caps, in-amp bias voltage, and a multidrop slave side interface.

The load cell 300 and the voltage amplification board 302 may be housed in a housing assembly configured to protect the components from various external elements (e.g., dirt, water, bodily fluids, or the like). The housing assembly may include at least a first housing portion 304, a second housing portion 306, and a third housing portion 308. For example, the first housing portion 304 may include a top domed housing portion 304 configured to house at least a portion of the load cell 300 and the voltage amplified 302. By way of another example, the second housing portion 306 may include a bottom housing portion 306 configured to house at least a portion of the load cell 300 and the voltage amplified 302. By way of another example, the third housing portion 308 may include an amplification cover housing portion 306 configured to house at least a portion of the voltage amplification board 302.

The top domed housing portion 304 may have one degree of freedom along the z-axis. For example, the top domed housing portion 304 may be configured to float freely along the z-axis, limiting any friction that would cause inaccuracies in the weight calculation by the patient weighing system.

Each sensor sub-system 106 may further include a contact point/head 310. For example, the sensor sub-system 106 may include dowel pin 310. The dowel pin 310 may be configured to lock into place within the top housing portion 304. For example, the dowel pin 310 may be configured to have a firm point of contact between the top dome housing portion 304 and the load cell 300.

Referring to FIGS. 5A-8D, each overlay of the set of overlays 104 may include a set of sensor sub-systems 106. For example, each sensor sub-system may be configured to couple to a surface (or face) of each overlay. In one instance, an underside of the bottom housing portion 306 may be configured to couple to a bottom surface (or bottom face) of the overlay. In another instance, a bottom surface of the overlay may include the bottom housing portion, such that the sensor sub-system may couple directly to the bottom surface of the overlay via the integrated bottom housing portion. It is noted that the sensor sub-systems 108 may be coupled to the overlays 104 via any coupling mechanism including, but not limited to, one or more adhesives (e.g., single component epoxy adhesive, structural acrylic adhesive, two component epoxy adhesive, or the like), fasteners, rivets, or the like.

Each overlay may include at least three sets of sensor sub-systems 106 arranged on a bottom surface of each overlay. It is noted that the system may include any number of sensor sub-systems suitable for obtaining an accurate patient weight. For example, in some embodiments, each overlay may include at least four sets of sensor sub-systems 106 arranged on a bottom surface of each overlay. By of another example, in some embodiments, each overlay may include at least three sets of sensor sub-systems 106 arranged on a bottom surface of each overlay, where the three sensor sub-systems 106 make up a plane. Each sensor sub-system within the set of sensor sub-systems 106 may be communicatively coupled to each other. Further, each set of sensor sub-systems may be communicatively coupled to each other. For example, each load cell 300 may be configured to communicate with surrounding load cells. By way of another example, each set of load cells may be configured to communicate with additional sets of load cells. In this regard, sensor data (e.g., patient weight measurements, or the like) from each sensor sub-system may be communicated to other sensor sub-systems, such that a distributed patient weight may be accurately calculated.

Figure 5A:
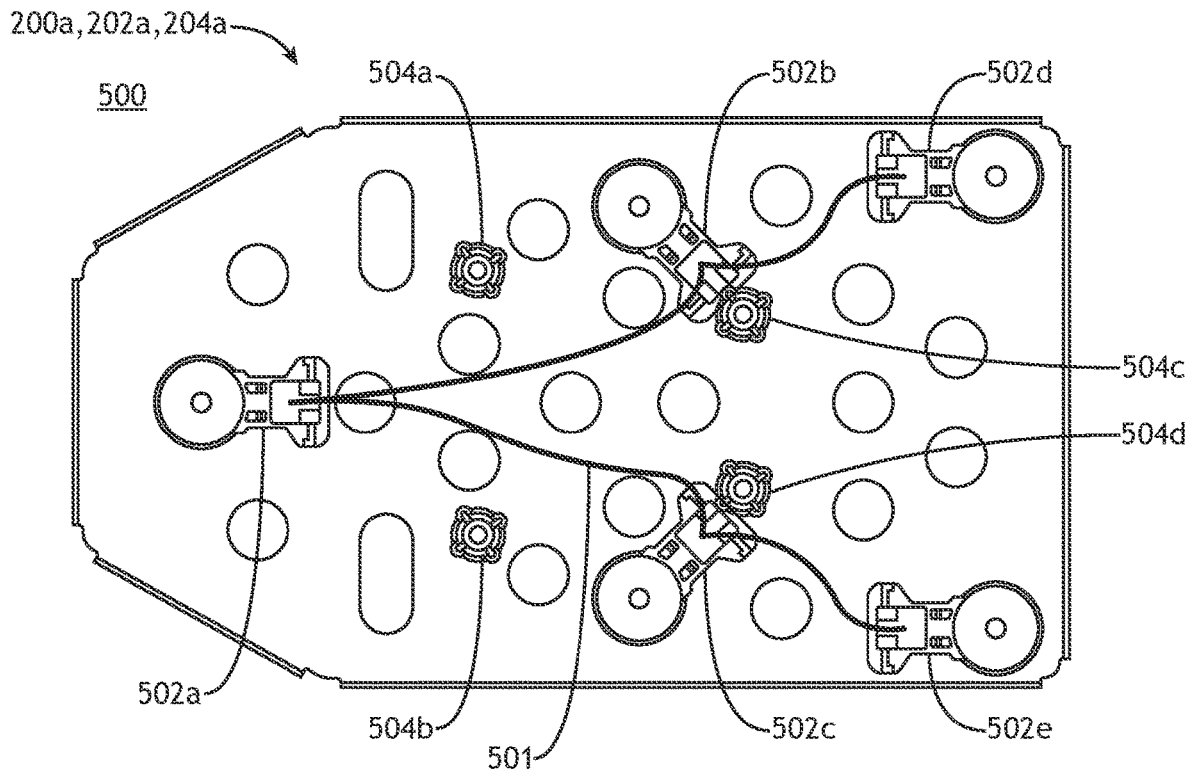
FIGS. 5A-8D illustrate schematic views of overlays including a set of sensor sub-systems and attachment sub-systems of the patient weighing system, in accordance with one or more embodiments of the present disclosure.

Referring to FIG. 5A, each sensor sub-system 106 of the set of sensor systems 106 may be daisy chained together. For example, the one or more wires 501 may be daisy chained from one of the one or more load cells to another and all the way to a main printed circuit board (PCB) (not shown in this figure). The one or more wires 501 may be held in place via one or more adhesives (e.g., electrical tape, or the like), one or more wire management devices, or the like. For purposes of simplicity the wires are not shown in FIGS. 5B-8D, however, FIGS. 5B-8D are provided merely for illustrative purposes and should not be construed as limiting the scope of the present disclosure.

Referring generally to FIGS. 5A-8D, the overlays 500-810 may include any configuration of sensor sub-systems 502a-812e. For example, as shown in FIGS. 5A-5B, the top overlay 500 may include at least three sensor sub-systems 106 coupled to a bottom surface of the top overlay. For instance, the top overlay 500 may include a first top overlay sensor sub-system 502a, a second top overlay sensor sub-system 502b, a third top overlay sensor sub-system 502c, a fourth top overlay sensor sub-system 502d, and a fifth top overlay sensor sub-system 502e. Each of the top overlay sensor sub-systems 502a-502e may be communicatively coupled to each other, such that each load cell of the top overlay sensor sub-systems 502a-502d may be communicatively coupled to each other.

Figure 6A:
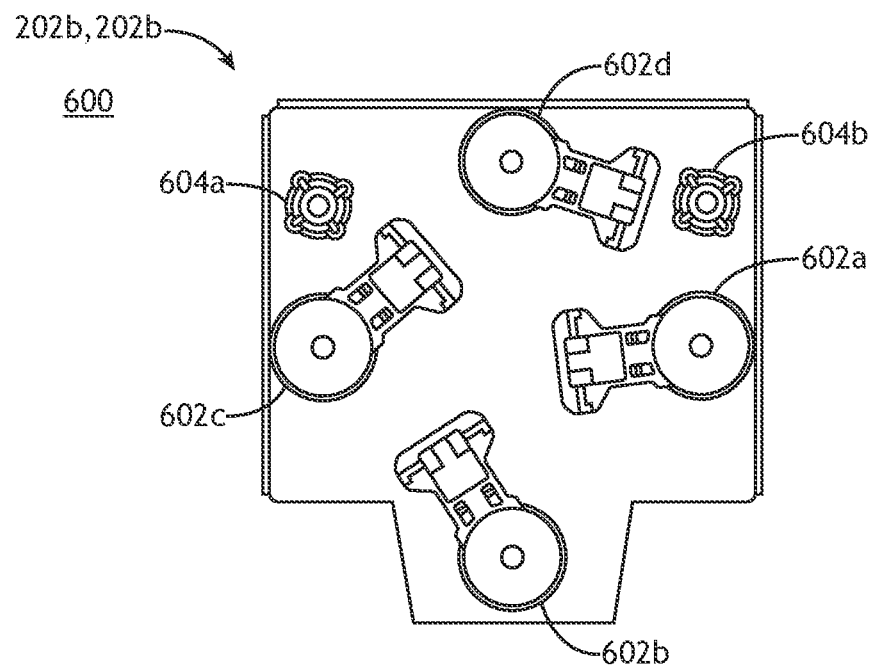
Figure 6B:
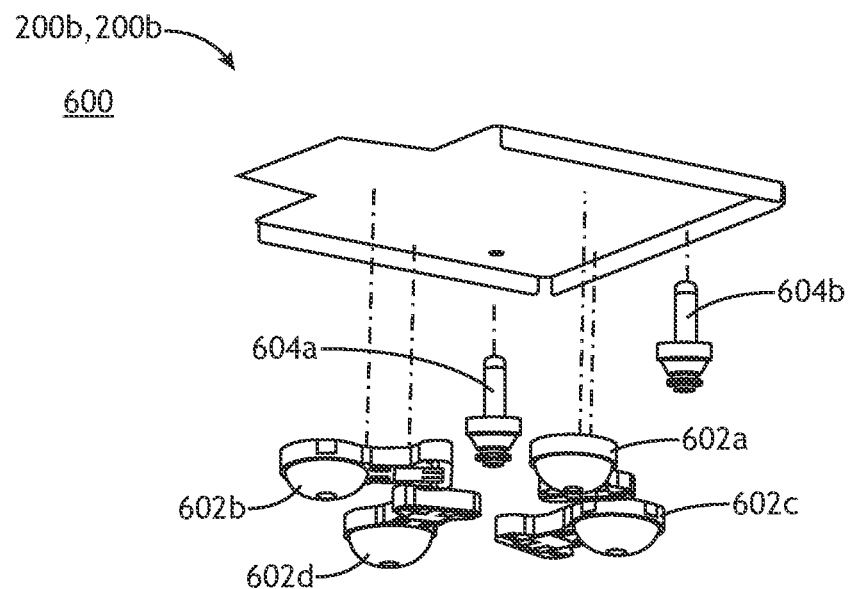

By way of another example, as shown in FIGS. 6A-6B, the knee catch overlay 600 may include at least three sensor sub-systems 106 coupled to a bottom surface of the knee catch overlay. For instance, the knee catch overlay 600 may include a first knee catch overlay sensor sub-system 602a, a second knee catch overlay sensor sub-system 602b, a third knee catch overlay sensor sub-system 602c, and a fourth knee catch overlay sensor sub-system 602d. Each of the knee catch overlay sensor sub-systems 602a-602d may be communicatively coupled to each other, such that each load cell of the knee overlay sensor sub-systems 602a-602d may be communicatively coupled to each other.

Figure 7A:
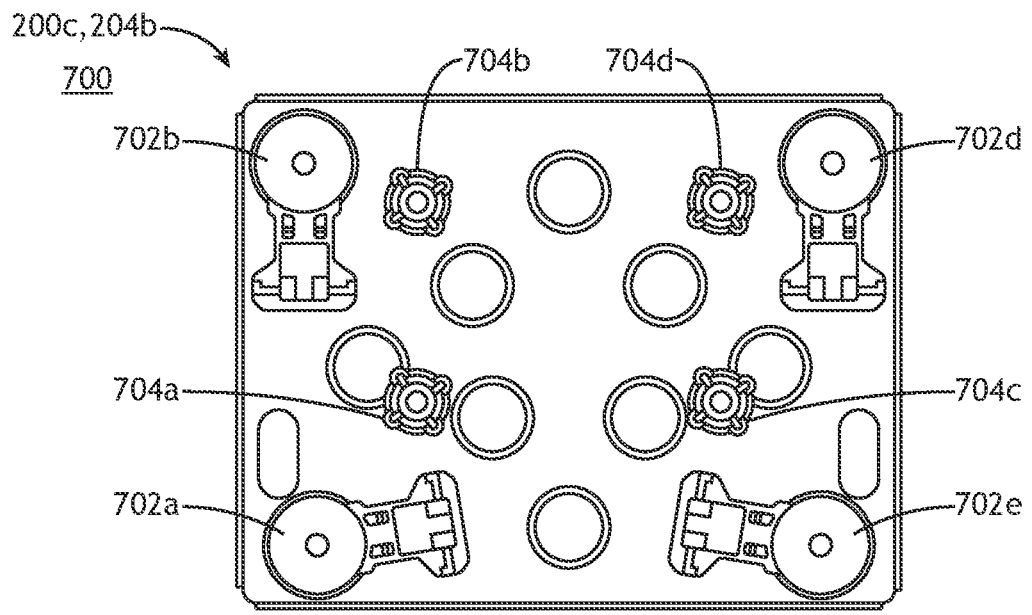
Figure 7B:
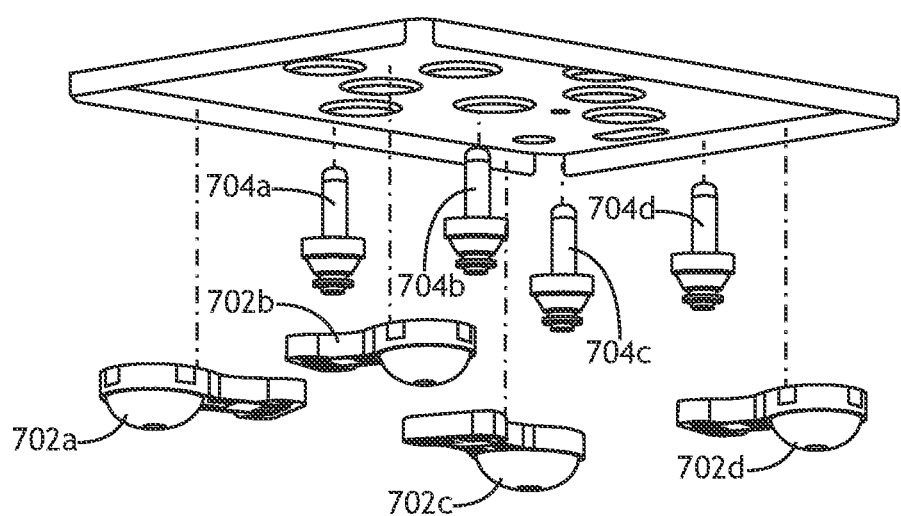
Figure 7C:
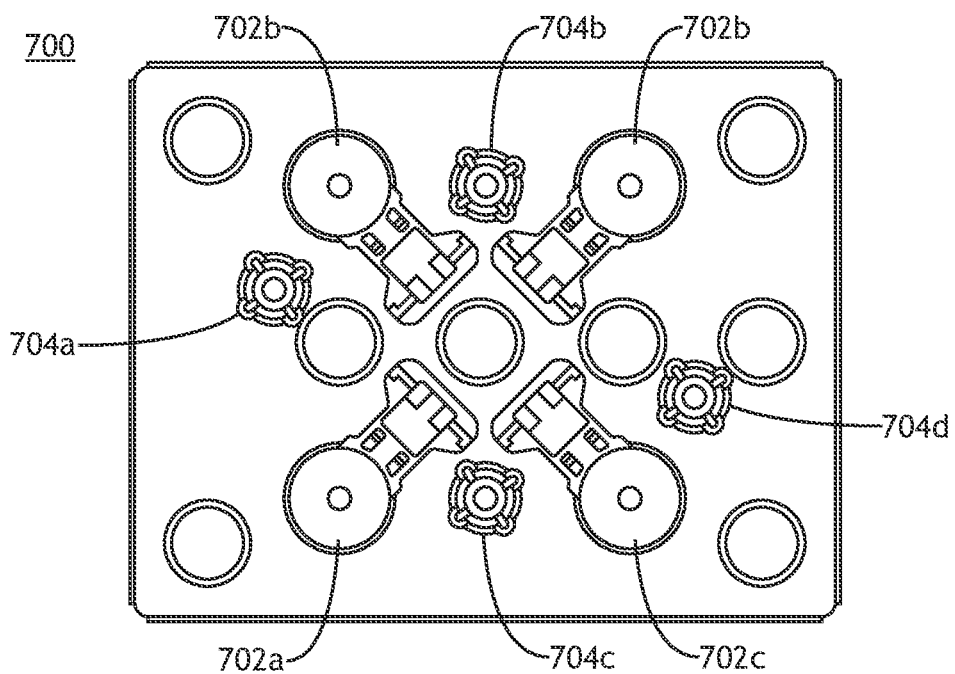
Figure 7D:
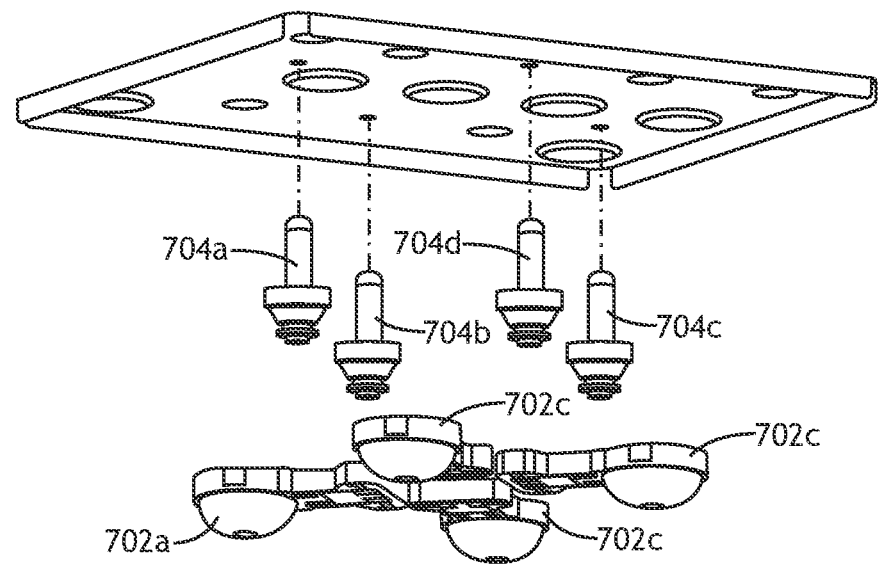

By way of another example, as shown in FIGS. 7A-7D, the middle overlay 700 may include at least three sensor sub-systems 106 coupled to a bottom surface of the middle overlay. For instance, the middle overlay 700 may include a first middle overlay sensor sub-system 702a, a second middle overlay sensor sub-system 702b, a third middle overlay sensor sub-system 702c, and a fourth middle overlay sensor sub-system 702d. Referring to FIGS. 7A-7B, the middle overlay 700 may include a first middle overlay sensor 702a on a first corner of the overlay 700, a second middle overlay sensor sub-system 702b on a second corner of the overlay 700, a third middle overlay sensor sub-system 702c on a third corner of the overlay 700, and a fourth middle overlay sensor sub-system 702d on a fourth corner of the overlay 700. Referring to FIGS. 7C-7D, the middle overlay 710 may include the four middle overlay sensor sub-systems 702a-702b arranged in a middle portion of the overlay 700 in a plus-sign configuration. Each of the middle overlay sensor sub-systems 702a-702d may be communicatively coupled to each other, such that each load cell of the middle overlay sensor sub-systems 702a-702d may be communicatively coupled to each other.

Figure 8A:
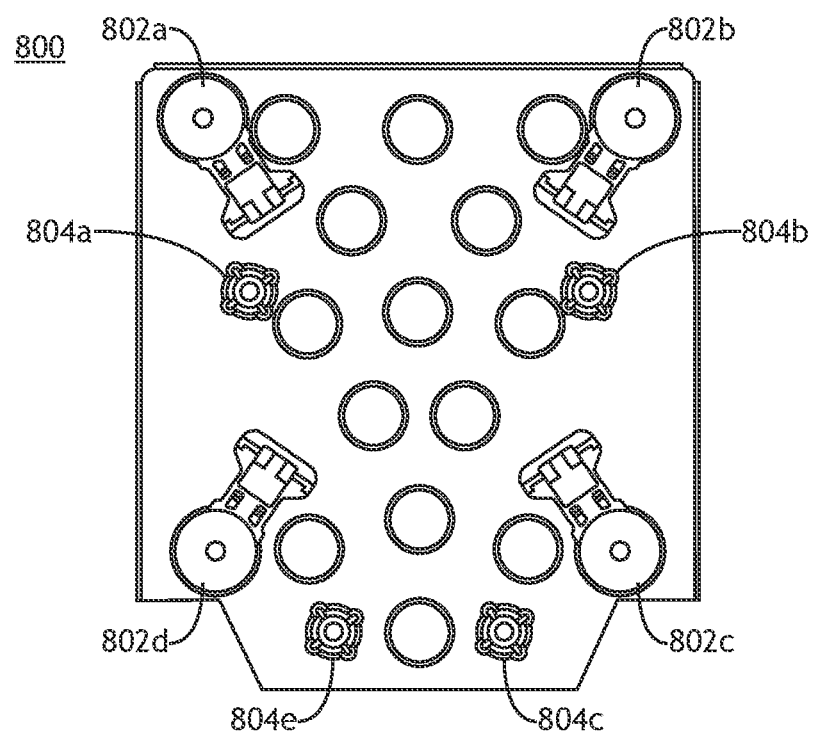
Figure 8B:
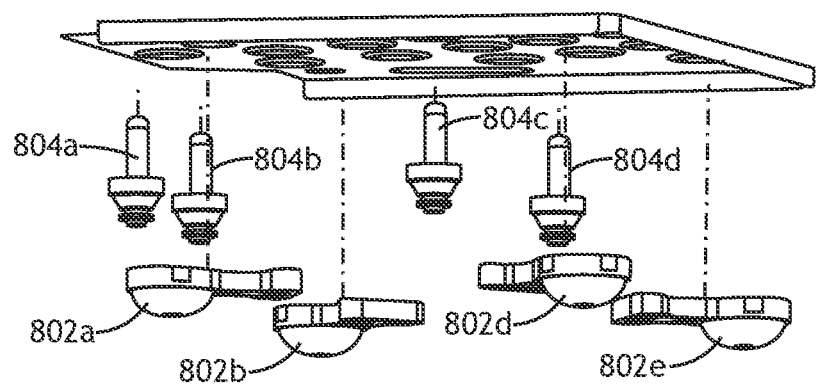
Figure 8C:
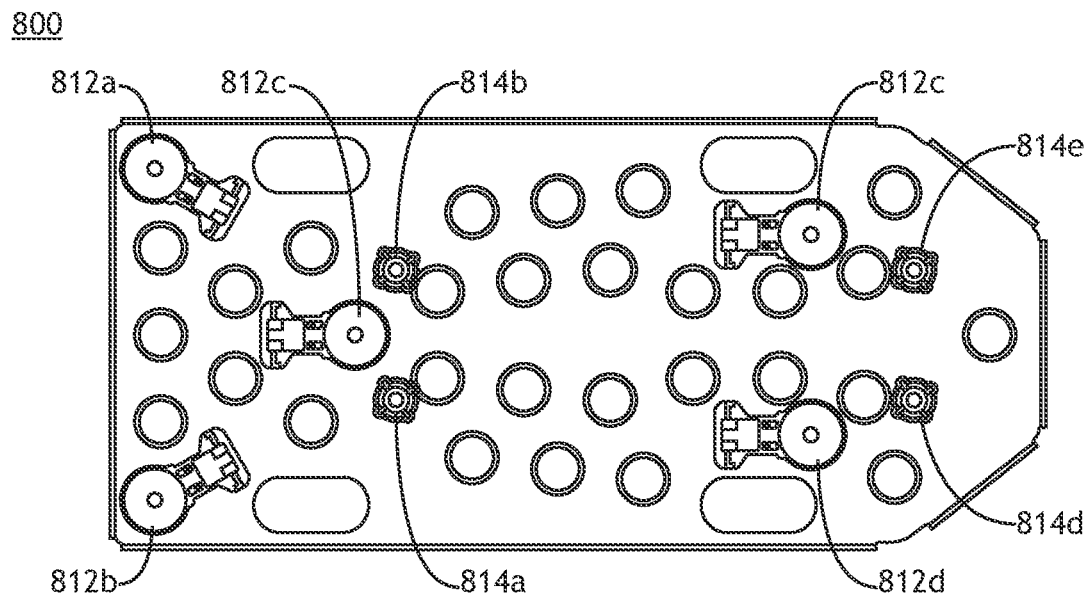
Figure 8D:
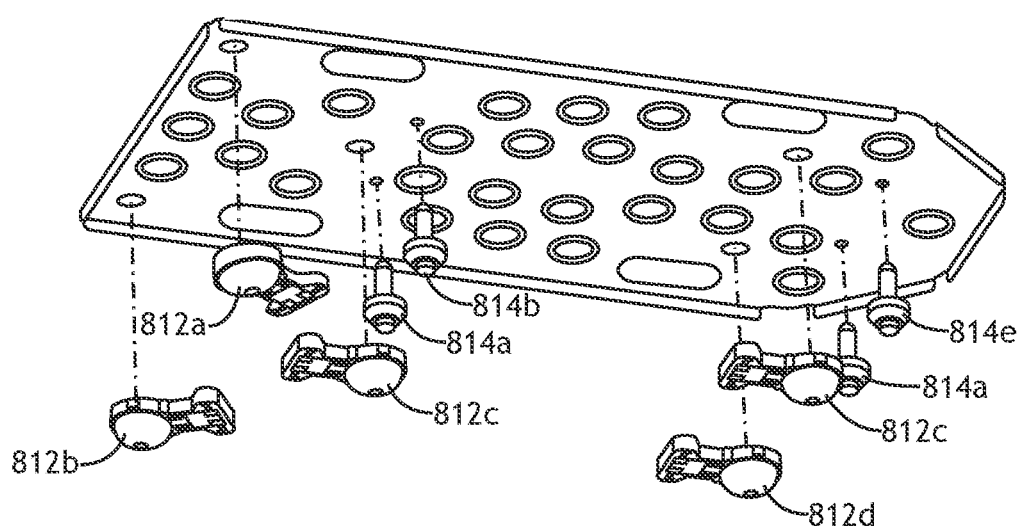

By way of another example, as shown in FIGS. 8A-8D, the bottom overlay 800, 810 may include at least three sensor sub-systems 106 coupled to a bottom surface of the bottom overlay. In one instance, as shown in FIGS. 8A-8B, the bottom overlay 800 may include a first bottom overlay sensor sub-system 802a, a second bottom overlay sensor sub-system 802b, a third bottom sensor sub-system 802c, and a fourth bottom overlay sensor sub-system 802d. In another instance, as shown in FIGS. 8C-8D, the bottom overlay 810 may include a first bottom overlay sensor sub-system 812a, a second bottom overlay sensor sub-system 812b, a third bottom sensor sub-system 812c, a fourth bottom overlay sensor sub-system 812d, and a fifth bottom sensor sub-system 812e. Each of the bottom overlay sensor sub-systems 802a-802d, 812a-812e may be communicatively coupled to each other, such that each load cell of the bottom overlay sensor sub-systems 802a-802d, 812a-812e may be communicatively coupled to each other.

Each set of sensor sub-systems of each overlay may be configured to operate independently to calculate a portion of a patient weight, such that a total patient may be calculated by summing together each calculated patient weight from each overlay/sensor sub-system. In this regard, each overlay may operate as its own scale.

For example, as shown in FIG. 2A, the patient weighing system 100 may include a top overlay, a knee catch overlay, a middle overlay, and a bottom overlay. In this example, the top overlay sensor sub-system 502a-502e may be configured to calculate a first weight corresponding to a first portion of a patient's body. Continuing with this example, the knee catch overlay sensor sub-system 602a-602d may be configured to calculate a second weight corresponding to a second portion of a patient's body. Continuing with this example, the middle overlay sensor sub-system 702a-702d may be configured to calculate a third weight corresponding to a third portion of a patient's body. Continuing with this example, the bottom overlay sensor sub-system 802a-802d may be configured to calculate a fourth weight corresponding to a fourth portion of a patient's body. In this example, a total patient weight may be calculated by summing together the first weight from the top overlay, second weight from the knee catch overlay, third weight, from the middle overlay, and fourth weight from the bottom overlay.

By way of another example, as shown in FIG. 2B, the patient weighing system 100 may include a top overlay, a knee catch overlay, and a bottom overlay. In this example, the top overlay sensor sub-system 502a-502e may be configured to calculate a first weight corresponding to a first portion of a patient's body. Continuing with this example, the knee catch overlay sensor sub-system 602a-602d may be configured to calculate a second weight corresponding to a second portion of a patient's body. Continuing with this example, the bottom overlay sensor sub-system 812a-812d may be configured to calculate a third weight corresponding to a third portion of a patient's body. In this example, a total patient weight may be calculated by summing together the first weight from the top overlay, second weight from the knee catch overlay, and a third weight from the bottom overlay.

By way of another example, as shown in FIG. 2C, the patient weighing system 100 may include a top overlay, a middle overlay, and a bottom overlay. In this example, the top overlay sensor sub-system 502a-502e may be configured to calculate a first weight corresponding to a first portion of a patient's body. Continuing with this example, the middle overlay sensor sub-system 702a-702d may be configured to calculate a second weight corresponding to a second portion of a patient's body. Continuing with this example, the bottom overlay sensor sub-system 802a-802d may be configured to calculate a third weight corresponding to a third portion of a patient's body. In this example, a total patient weight may be calculated by summing together the first weight from the top overlay, second weight from the middle overlay, and third weight from the bottom overlay.

Although FIGS. 2A-2C and FIGS. 5A-8D illustrates a specific overlay and sensor sub-system configuration, it is noted herein that the patient weighing system 100 may include any configuration of overlays and sensor sub-systems.

The patient weighing system 100 may further include a set of attachment sub-systems 108 configured to couple the patient weighing system 100 to a patient transport device 102 via the one or more cut outs 207, 209. Referring generally to FIGS. 5A-8D, the overlays 500-810 may include any configuration of attachment sub-systems 504a-814d.

Figure 5B:
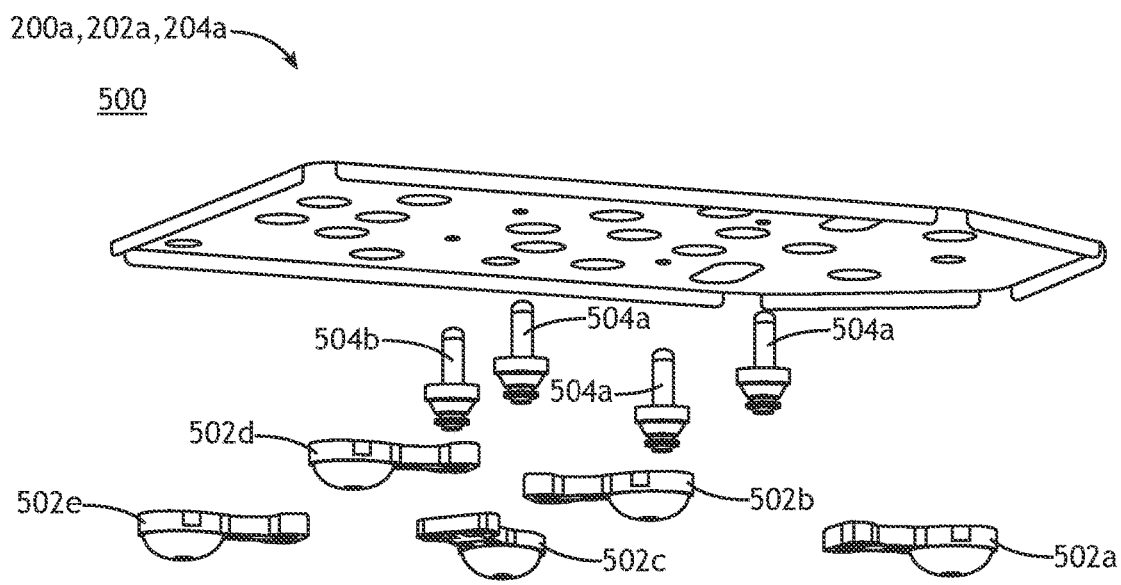

For example, as shown in FIGS. 5A-5B, the top overlay 500 may include at least four attachment sub-systems 108 configured to couple the top overlay to a top portion of the patient transport device 102 (e.g., a top frame portion 201a, 203a, 205a of the patient transport device). For instance, the top overlay 500 may include a first top overlay attachment sub-system 504a, a second top overlay attachment sub-system 504b, a third top overlay attachment sub-system 504c, and a fourth top overlay attachment sub-system 504d.

By way of another example, as shown in FIGS. 6A-6B, the knee catch overlay 600 may include at least four attachment sub-systems 108 configured to couple the knee catch overlay to a knee catch portion of the patient transport device 102 (e.g., a knee catch frame portion 201b, 203b of the patient transport device). For instance, the knee catch overlay 600 may include a first knee catch overlay attachment sub-system 604a and a second knee catch overlay attachment sub-system 604b.

By way of another example, as shown in FIGS. 7A-7D, the middle overlay 700 may include at least four attachment sub-systems 108 configured to couple the middle overlay to a middle portion of the patient transport device 102 (e.g., a middle frame portion 201c, 205b of the patient transport device). For instance, the middle overlay 700 may include a first middle overlay attachment sub-system 704*a*, a second middle overlay attachment sub-system 704*b*, a third middle overlay attachment sub-system 704*c*, and a fourth middle overlay attachment sub-system 704*d*.

By way of another example, as shown in FIGS. 8A-8D, the bottom overlay 800, 810 may include at least four attachment sub-systems 108 configured to couple the bottom overlay to a bottom portion of the patient transport device 102 (e.g., a bottom frame portion 201*d*, 203*c*, 205*c* of the patient transport device). For instance, as shown in FIGS. 8A-8B, the bottom overlay 800 may include a first bottom overlay attachment sub-system 804*a*, 814*a*, a second bottom overlay attachment sub-system 804*b*, 814*b*, a third bottom attachment sub-system 804*c*, 814*c*, and a fourth bottom overlay attachment sub-system 804*d*, 814*d*.

Figure 4:
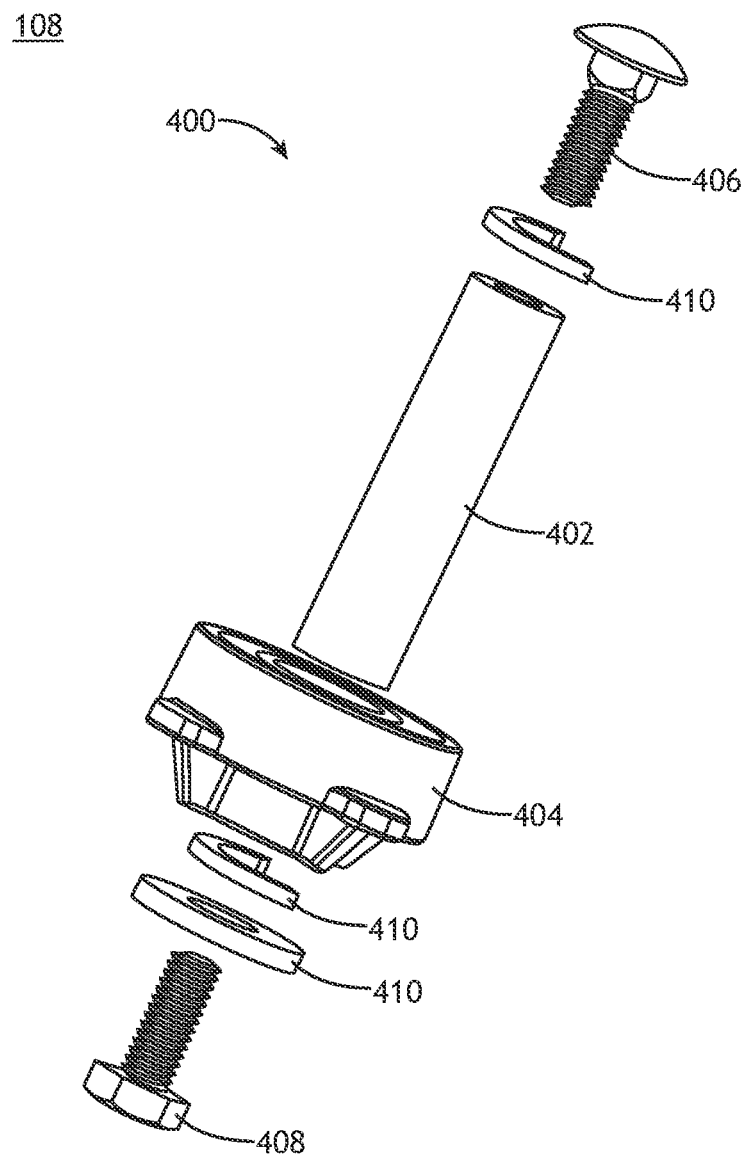
FIG. 4 illustrates an exploded view of an attachment sub-system of the patient weighing system, in accordance with one or more embodiments of the present disclosure.

Referring to FIG. 4, each attachment system 108 of the set of attachment sub-systems 108 may include a hole guide assembly 400 configured to secure each overlay of the set of overlays 104 to the patient transport device 102 via one or more cut outs 207, 209. For example, each hole guide assembly 400 may include a guide support 402, a guide 404, and one or more fasteners. For instance, the guide 404 may be configured to hold the overlay in place and the guide support 402 may be configured to lock the guide 404 into place while allowing for one degree of freedom on the z-axis. In this regard, the guide 404 may be configured to penetrate through the one or more cut outs 207 of the overlay and the one or more cut outs 209 on the frame of the patient transport device 102, while the guide support 402 may lock the guide into place.

The guide support 402 may include a female dual threaded rod. For example, the guide support 402 (e.g., the female duel threaded rod) may act as a pole and may be configured to inserted into the guide 404.

The one or more fasteners may include, but are not limited to, a square neck carriage bolt 406, a common hex head fastener 408, one or more washers 410, and the like. For example, the square neck carriage bolt 406 may be configured connect to each overlay 104 and be the point of contact that keeps each overlay 104 in place while allowing only for one degree of freedom. By way of another example, the common hex head fastener 408 may be configured to couple underneath the guide support 402 and hold it in place. By way of another example, the one or more washers 410 may be used as spacers, allowing the bolt 406 and fastener 408 to be thoroughly locked in place. It is noted herein that the one or more fasteners are not limited to the examples above, but may include any fastener known in the art including, but not limited to, one or more threaded screws, one or more non-threaded screws, one or more bolts, or the like.

Referring again to FIG. 1A, the patient weighing system 100 may further include one or more controllers 110. The one or more controllers 110 including one or more processors 112 and memory 114. The one or more processors 110 may be configured to execute a set of program instructions stored in memory 114, the set of program instructions configured to cause the one or more processors 112 to carry out one or more steps of the present disclosure.

The one or more controllers 110 may be coupled to a communication interface. 116. The communication interface 116 may include any communication interface known in the art. For example, the communication interface may include, but is not limited to, Zigbee, Raspberry Pi, a wired universal asynchronous receiver-transmitter (UART), or the like.

In some embodiments, the system 100 may further include a sensor interface 118. For example, the system 100 may include a sensor interface operated through the communication interface 116. The sensor interface 118 may be coupled to the set of sensor sub-systems 106.

The system 100 may further include a power source 120. The power source 120 may include any power source known in the art including, but not limited to, a rechargeable battery pack, or the like.

The one or more controllers, the power source, and the communication interface may be housed in a housing. For example, the housing may be formed of a protective material to protect one or more components of the controller from external damage.

The patient weighing system 100 may further include one or more user interfaces 122. The one or more user interfaces 122 may include any user interface known in the art including, but not limited to, a tablet, smartphone, phablet, or the like. The user interface device 122 may include one or more user input devices 124 configured to receive one or more input commands from a user. The user interface device 122 may include a display 126 configured to display data of the patient weighing system 100 to the user. For example, the display may include, but is not limited to, a liquid crystal display (LCD), an organic light-emitting diode (OLED) based display, or a CRT display.

The communication interface 116 may be communicatively coupled to the one or more user interface devices 122. For example, the communication interface 116 may be coupled such that the one or more user interfaces 122 may be configured to operate each set of sensor sub-systems 106 and perform weight-based calculations. In one instance, the communication interface 116 may be coupled via a wired connection to the user interface device 122 to operate scale. In another instance, the communication interface 116 may be coupled via a wireless connection (e.g., Bluetooth connection, WiFi connection, or the like) to the user interface device 122.

Referring to FIG. 1B, the user interface device 122 may be configured to mechanically couple (e.g., Velcro, magnet, fastener, or the like) to an exterior surface of the patient transport device 102. The user interface device 122 may be configured to attach or detach from the exterior surface of the patient transport device 102 to provide information to the EMS while away from the patient transport device 102.

It is noted herein that the one or more components of the disclosed system may be communicatively coupled to the various other components of the system in any manner known in the art. For example, the one or more components may be communicatively coupled to each other and other components via a wireline (e.g., copper wire, fiber optic cable, USB, and the like) or wireless connection (e.g., RF coupling, IR coupling, data network communication (e.g., Wi-Fi, WiMAX, Bluetooth and the like).

Applicant notes herein that the system may have a number of benefits. For example, the system may be configured to help decrease liability and improve patient care by reducing prehospital dosing error, improve stroke patient response time and provide necessary information to EMS air services. The system may be configured to reduce pediatric dose errors, improve stroke patient care, and improve air EMS services. This is accomplished by obtaining an accurate weight of the patient, eliminating the need for medical professionals to do drug calculations and providing proper administration techniques.

The previous description is presented to enable one of ordinary skill in the art to make and use the invention as provided in the context of a particular application and its requirements. As used herein, directional terms such as "top," "bottom," "over," "under," "upper," "upward,"

"lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. A patient weighing system, the patient weighing system comprising:
    a set of overlays configured to cover a top face of a patient transport device, each overlay of the set of overlays including one or more cut outs;
    a set of attachment sub-systems, each attachment sub-system of the set of attachment sub-systems configured to couple each overlay of the set of overlays to the top face of the patient transport device, each attachment sub-system of the set of attachment sub-systems including a guide assembly, the one or more cut outs of each overlay of the set of overlays configured to receive a portion of the guide assembly;
    a set of sensor sub-systems, each overlay of the set of overlays including at least one set of sensor sub-systems arranged on a bottom face of each overlay of the set of overlays, each set of sensor sub-systems including at least three sensor sub-systems, each sensor sub-system of the set of sensor sub-systems including at least one load cell, the at least one load cell configured to electrically couple to at least one voltage amplification board, each sensor sub-system of the set of sensor sub-systems further including a housing assembly configured to house at least a portion of the at least one load cell, each housing assembly including at least a top domed housing portion, the top dome housing portion having one degree of freedom along a z-axis, the at least one load cell configured to compress and generate an electrical voltage when force is applied along the z-axis of the at least one load cell, each set of sensor sub-systems configured to measure a weight of a portion of a patient's body;
    a user interface device including a display; and
    a controller communicatively coupled to each sensor sub-system of the set of sensor sub-systems and the user interface device, the controller including one or more processors configured to execute a set of program instructions stored in a memory, the set of program instructions configured to cause the one or more processors to:
        receive at least a first weight corresponding to a first portion of a patient's body from the at least three sensor sub-systems of at least a first set of sensor sub-systems;
        receive at least an additional weight corresponding to an additional portion of a patient's body from the at least three sensor sub-systems of at least an additional set of sensor sub-systems;
        calculate a total patient weight by summing the received first weight and received additional weight; and
        generate one or more control signals configured to cause the display of the user interface device to display the calculated total patient weight.

2. The patient weighing system of claim 1, wherein the set of overlays includes at least a top overlay and a bottom overlay, the set of overlays further including at least one of a middle overlay or a knee catch overlay.

3. The patient weighing system of claim 2, wherein the set of sensor sub-systems includes at least a first set of sensor sub-systems coupled to one or more portions of the top overlay, a second set of sensor sub-systems coupled to one or more portions of at least one of the middle overlay or the knee catch overlay, and a third set of sensor sub-systems coupled to one or more portions of the bottom overlay.

4. The patient weighing system of claim 3, wherein the one or processors are configured further to:
    receive a first weight corresponding to a first portion of a patient's body from the first set of sensor sub-systems of the top overlay;
    receive a second weight corresponding to a second portion of a patient's body from the second set of sensor sub-systems of the middle overlay or the knee catch overlay;
    receive a third weight corresponding to a third portion of a patient's body from the third set of sensor sub-systems of the bottom overlay;
    calculate a total patient weight by summing the received first weight, the received second weight, and the received third weight; and
    generate one or more control signals configured to cause a display of the user interface device to display the calculated total patient weight.

5. The patient weighing system of claim 1, wherein the set of overlays includes at least a top overlay, a knee catch overlay, a middle overlay, and a bottom overlay.

6. The patient weighing system of claim 5, wherein the set of sensor sub-systems includes at least a first set of sensor sub-systems coupled to one or more portions of the top overlay, a second set of sensor sub-systems coupled to one or more portions of the knee catch overlay, a third set of sensor sub-systems coupled to one or more portions of the middle overlay, and a fourth set of sensor sub-systems coupled to a portion of the bottom overlay.

7. The patient weighing system of claim 6, wherein the one or more processors are further configured to:
    receive a first weight corresponding to a first portion of a patient's body from the first set of sensor sub-systems of the top overlay;
    receive a second weight corresponding to a second portion of a patient's body from the second set of sensor sub-systems of the knee catch overlay;
    receive a third weight corresponding to a third portion of a patient's body from the third set of sensor sub-systems of the middle overlay;
    receive a fourth weight corresponding to a fourth portion of a patient's body from the fourth set of sensor sub-systems of the bottom overlay;
    calculate a total patient weight by summing the received first weight, the received second weight, the received third weight, and the received fourth weight; and generate one or more control signals configured to cause a display of the user interface device to display the calculated total patient weight.

8. The patient weighing system of claim 1, wherein the patient transport devices includes at least one of a gurney or a stretcher.

9. The patient weighing system of claim 8, wherein a top face of the set of overlays is configured to receive a bottom portion of a cushion of the patient transport device.

10. A patient weighing system, the patient weighing system comprising:
- a set of overlays configured to cover a top face of a patient transport device;
- a set of attachment sub-systems, each attachment sub-system of the set of attachment sub-systems configured to couple each overlay of the set of overlays to the top face of the patient transport device, each attachment sub-system of the set of attachment sub-systems including a guide assembly; and
- a set of sensor sub-systems, each overlay of the set of overlays including at least one set of sensor sub-systems arranged on a bottom face of each overlay of the set of overlays, each set of sensor sub-systems including at least three sensor sub-systems, each sensor sub-system of the set of sensor sub-systems including at least one load cell, the at least one load cell configured to electrically couple to at least one voltage amplification board, each sensor sub-system of the set of sensor sub-systems further including a housing assembly configured to house at least a portion of the at least one load cell, each housing assembly including at least a top domed housing portion, the top dome housing portion having one degree of freedom along a z-axis, the at least one load cell configured to compress and generate an electrical voltage when force is applied along the z-axis of the at least one load cell, each set of sensor sub-systems configured to measure a weight of a portion of a patient's body.

11. The patient weighing system of claim 10, wherein each overlay of the set of overlays further comprises one or more cut outs, the one or more cut outs of each overlay of the set of overlays configured to receive a portion of the guide assembly.

12. The patient weighing system of claim 10, wherein each sensor sub-system of the set of sensor sub-systems further comprises at least one dowel pin, the at least one dowel pin configured to compress the at least one load cell to cause the at least one load cell to generate the electrical voltage when force is applied along the z-axis.

13. The patient weighing system of claim 10, wherein the system further comprises:
- at least one voltage amplification board configured to electrically couple to the at least one load cell.

14. The patient weighing system of claim 10, wherein the set of overlays includes at least a top overlay and a bottom overlay, the set of overlays further including at least one of a middle overlay or a knee catch overlay.

15. The patient weighing system of claim 14, wherein the set of sensor sub-systems includes at least a first set of sensor sub-systems coupled to one or more portions of the top overlay, a second set of sensor sub-systems coupled to one or more portions of at least one of the middle overlay or the knee catch overlay, and a third set of sensor sub-systems coupled to one or more portions of the bottom overlay.

16. The patient weighing system of claim 10, wherein the set of overlays includes at least a top overlay, a knee catch overlay, a middle overlay, and a bottom overlay.

17. The patient weighing system of claim 16, wherein the set of sensor sub-systems includes at least a first set of sensor sub-systems coupled to one or more portions of the top overlay, a second set of sensor sub-systems coupled to one or more portions of the knee catch overlay, a third set of sensor sub-systems coupled to one or more portions of the middle overlay, and a fourth set of sensor sub-systems coupled to a portion of the bottom overlay.

18. The patient weighing system of claim 10, further comprising:
- a controller communicatively coupled to each sensor sub-system of the set of sensor sub-systems and the user interface device, the controller including one or more processors configured to execute a set of program instructions stored in a memory, the set of program instructions configured to cause the one or more processors to:
  - receive at least a first weight corresponding to a first portion of a patient's body from the at least three sensor sub-systems of at least a first set of sensor sub-systems;
  - receive at least an additional weight corresponding to an additional portion of a patient's body from the at least three sensor sub-systems of at least an additional set of sensor sub-systems; and
  - calculate a total patient weight by summing the received first weight and received additional weight.

19. The patient weighing system of claim 18, further comprising:
- a user interface device including a display, the controller communicatively coupled to the user device, the one or more processors further configured to generate one or more control signals configured to cause the display of the user interface device to display the calculated total patient weight.

20. A patient weighing system, the patient weighing system comprising:
- an overlay configured to cover a top face of a patient transport device, the overlay including one or more cut outs;
- a set of attachment sub-systems, each attachment sub-system of the set of attachment sub-systems configured to couple the overlay to the top face of the patient transport device, each attachment sub-system of the set of attachment sub-systems including a guide assembly, the one or more cut outs of the overlay configured to receive a portion of the guide assembly;
- a set of sensor sub-systems, the overlay including at least one set of sensor sub-systems arranged on a bottom face of the overlay, each set of sensor sub-systems including at least three sensor sub-systems, each sensor sub-system of the set of sensor sub-systems including at least one load cell, the at least one load cell configured to electrically couple to at least one voltage amplification board, each sensor sub-system of the set of sensor sub-systems further including a housing assembly configured to house at least a portion of the at least one load cell, each housing assembly including at least a top domed housing portion, the top dome housing portion having one degree of freedom along a z-axis, the at least one load cell configured to compress and generate an electrical voltage when force is applied along the z-axis of the at least one load cell;
- a user interface device including a display; and
- a controller communicatively coupled to each sensor sub-system of the set of sensor sub-systems and the user interface device, the controller including one or more processors configured to execute a set of program instructions stored in a memory, the set of program instructions configured to cause the one or more processors to:

receive a patient weight of a patient's body from the at least three sensor sub-systems; and generate one or more control signals configured to cause the display of the user interface device to display the calculated patient weight.

* * * * *